Oct. 4, 1955     W. C. PANZER     2,719,413
ROTARY SERVING DEVICE
Filed Sept. 24, 1952
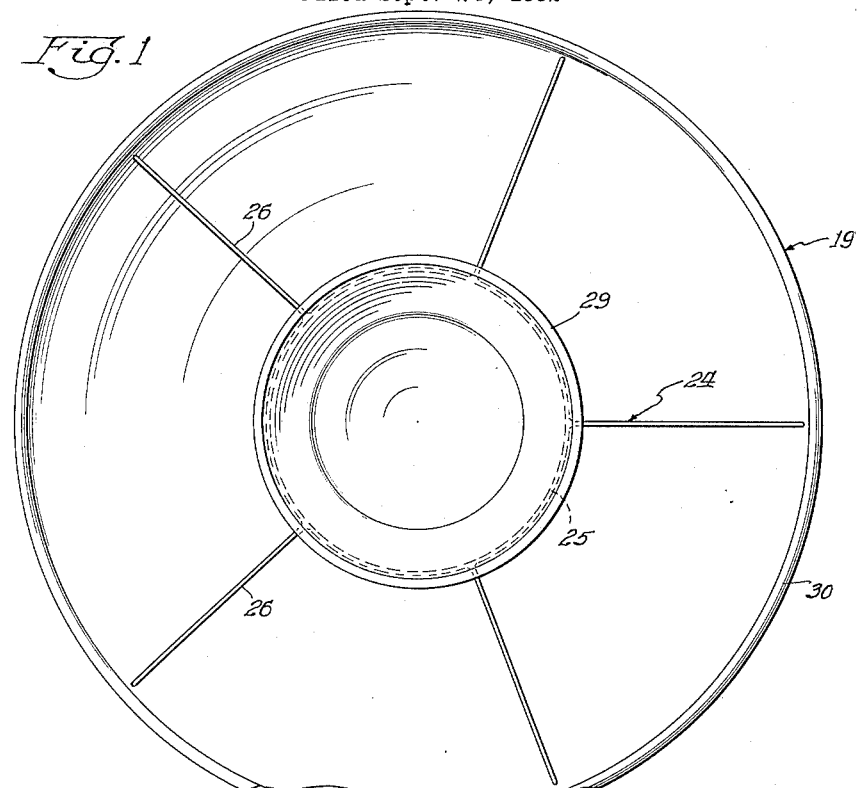
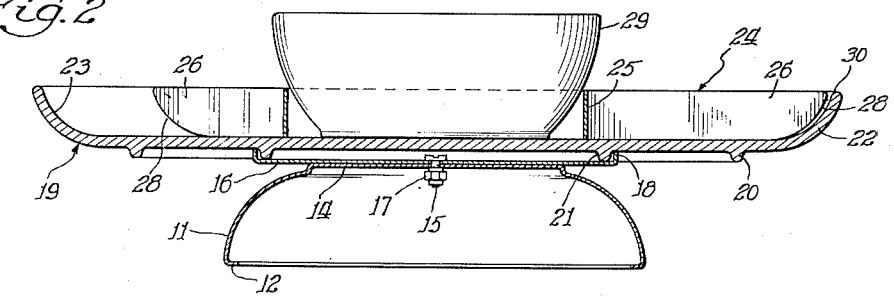
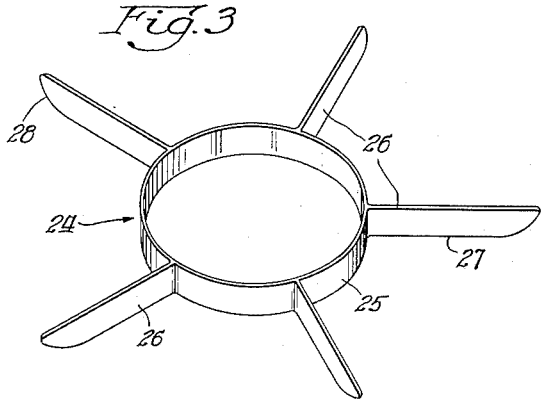
Inventor:
William C. Panzer
By: Jones, Tesch & Darbo
Attys.

United States Patent Office 2,719,413
Patented Oct. 4, 1955

2,719,413

ROTARY SERVING DEVICE

William C. Panzer, Chicago, Ill.

Application September 24, 1952, Serial No. 311,177

1 Claim. (Cl. 65—55)

This invention relates to a rotary serving device more particularly for foods such as pickles, olives, jams, cottage cheese, nuts, candies and other appetizers or relishes. Such a device, which is of relatively large size and colloquially known as a "Lazy Susan," is commonly used as a centerpiece for dining or coffee tables and includes a base and a dish or dishes rotatable on the base to present successive portions thereof to the users respectively.

The present invention, among other objects, provides an improved and simplified device of this character, parts of which may advantageously be made of metal for economy of manufacture and for interchangeability, as well as permitting easier cleaning and reduction in weight.

In one aspect, the invention contemplates a segregating element in the form, for example, of a sheet metal spider that cooperates with a rotatable tray to provide a retainer for a central dish or bowl and separate peripheral compartments or sectors for other food items, the spider being liftable from the tray for ready cleaning of the parts and for interchangeability, thus affording the possibility, with the same device, of various spiders having different numbers of arms for accommodating, for example, three, four, five or six, separated food compartments as may be desired to suit a fewer number of foods each of a larger quantity or a larger number of a smaller quantity each.

Other objects and advantages will be apparent from the following description, taken together with the accompanying drawings, of an illustrative embodiment of the invention, and in which drawings—

Figure 1 is a plan view of a serving device embodying the present invention;

Figure 2 is a diametrical section of parts shown in Fig. 1; and

Figure 3 is a separate view of the novel spider or segregating element following the present invention.

Referring in detail to the illustrative construction shown in the drawings, the numeral 11 indicates a base for the device, which in this instance is shown as a metallic domed member and desirably having an inturned lower margin 12 so as to avoid scratching a table upon which it may be disposed. Centrally thereof the member 11 is perforated in its upper wall 14 to pass therethrough a screw bolt 15, the latter also passing through a disc 16 which is rotatable on the upper wall 14 of the base 11, the wall 14 thus providing a platform for the disc 16 and the latter providing a turn-table rotatable on the platform. Nut 17 may be screwed on the bolt 15 to secure this relative rotative arrangement. The disc or turn-table 16 desirably has an upturned peripheral flange 18.

In accordance with the present invention, disposed on the turn-table 16 is a dish or tray member 19 which may be advantageously made of a ceramic material or suitably decorated chinaware. The tray 19 may have on its undersurface one or more concentric beads such as 20 and 21, the bead 21 in this instance being of a diameter just fitting within the flange 18 of the turn table 16 to locate the tray concentrically thereon. At its outer margin the tray 19 may be upturned in a curved contour 22 thus providing an upcurved inner margin 23, for both utility and appearance.

Still further in accordance with the present invention, disposed on and within the tray 19 is a segregating or partition unit which is here shown in the form of a spider member 24 having a central band-like portion 25 and preferably at least five diverging radial arms 26 that extend outwardly from the band portion. The arms 26 may be identical and may be secured in any suitable manner to the band portion 25, both the band portion and the arms being advantageously and inexpensively formed of sheet metal. The spider may be painted in any attractive color desired, such as green, yellow or red enamel to match or contrast with the color of the tray 19. The lower edge 27 of each arm is desirably curved upwardly or beveled, as at 28, to conform to the upwardly curved margin 23 of the tray 19.

When the spider member 24 is disposed on and within the tray 19 as shown in Figs. 1 and 2, the central portion 25 of the spider is located concentrically on the tray, since the arms 26 are of equal length and are of a length to lightly contact the margin of the tray when the spider is disposed thereon.

The upcurved margin 23 of the tray or dish 19 is flared continuously outwardly to its outer edge or rim 30 and the upcurved ends 28 of the spider arms 26 are similarly matingly flared, thus minimizing straight surfaces while increasing the arc of frictional contact therebetween and enhancing the effect of the light contact referred to when the dish is rotated on the turntable with the spider disposed therein and avoiding corners which would make the dish hard to clean when the spider is removed.

So constructed and arranged, the tray 19 and the spider 24 together provide locating means for a central dish such as the bowl 29 which may be disposed on the tray within the central portion 25 of the spider. At the same time, the arms 26 of the spider provide partitions on and within the tray 19 so that in each space between a pair of arms 26 a different food may be placed, the foods being kept apart one from the other.

The spider, which may have three or more of the partition arms 26, has in this instance, five such arms, thus providing five separate compartments for food. With the foods so placed therein, it will be understood that the foods themselves will prevent rotation of the spider on the tray, and this is also further desirably prevented by the weight of the bowl 29 which rests on the central portion 25 of the spider, the vertical height of the portion 25 being desirably such as to frictionally engage the bowl 29 when the latter is resting on the tray. The height of the arms 26 is desirably such as to be flush with the upper rim 30 of the tray 19 for efficiency and good appearance. Preferably the central portion 25 and arms 26 are of the same height as here.

The number of arms on the spider 24 could be varied as desired to suit the number of different foods which it might be desired to place on the tray but at least five is preferred. The central bowl 29 might contain potato chips, or a salad, or say, even a soup, or melted cheese. The separate compartments provided by the spider might contain successively pickles, olives, jams, cottage cheese or candy.

It will be apparent that with one of the serving devices here shown, a number of different spiders might be provided, one having say five arms, and another say having six arms, and these spiders could be used interchangeably with the tray 19 as desired, in each case the spider having the central part 25 for a bowl such as 29, regardless of the number of arms on the spider. The tray 19 may be rotated to bring any desired compartment on the tray into the vicinity of the person using the device at the moment, thus accommodating a number of people sitting around a table and minimizing the need for service by the hostess or her help.

The device of the present invention provides ready adaptability to various and different needs of the hostess while at the same time minimizing the number of chinaware parts which would otherwise be required to provide a serving device of the same capacity. Breakage of small china dishes which would otherwise be required is eliminated. If the device is desired to be used say for flowers, the spider 24 may be removed entirely. In any case, the ready removability and interchangeability of the spider accords a greater usefulness for the serving device and promotes simplicity and ease of cleaning and maintenance while at the same time effecting an economy and sturdiness of manufacture and efficiency of service.

The invention having been described, it may be embodied in such forms or modifications as fall within the scope of the appended claim.

The invention having been described, what is here claimed is:

In a rotary serving device embodying a base and a turntable rotatable thereon, that improvement comprising a circular dish carried on said turntable to rotate therewith, said dish having a central flat upper surface and an annular upwardly curved margin flaringly continuously outwardly to its outer edge, said surface and margin being uniformly smooth, and a separable spider member received in said dish, said spider member having a central circular band-like portion adapted to rest centrally on said dish surface and a plurality of at least more than three partition strips extending spoke-like substantially rigidly from the band-like portion spaced thereabout, said strips and band-like portion resting edgewise on said smooth surface and said strips being flaringly upcurved on their outer free ends to conform to the flaringly upcurved margin of the tray and contacting said margin when the spider member is in position on the dish, whereby the arc of frictional contact of the dish margin and the spoke ends is enhanced and the spider member is held from rotation with respect to the dish when food is placed on the dish surface between said strips, the dish and spider member being separable to leave the dish surface including said margin in said uniformly smooth condition and readily cleanable by the absence of corners therein.

References Cited in the file of this patent

UNITED STATES PATENTS

| | | | |
|---|---|---|---|
| D. 67,011 | Clark | Apr. 14, | 1925 |
| D. 102,967 | Daum | Jan. 26, | 1937 |
| 251,754 | Wires | Jan. 3, | 1882 |
| 348,839 | Grosz | Sept. 7, | 1886 |
| 435,723 | Barnes | Sept. 2, | 1890 |
| 846,948 | Richter | Mar. 12, | 1907 |
| 943,162 | Schlesinger | Dec. 14, | 1909 |
| 947,373 | Coleman, Sr. | Jan. 25, | 1910 |
| 948,434 | Scott | Feb. 8, | 1910 |
| 1,199,063 | Fleich | Sept. 26, | 1916 |
| 1,624,941 | Fulkerson | Apr. 19, | 1927 |
| 1,628,013 | Twedt | May 10, | 1927 |
| 2,034,478 | Levy | Mar. 17, | 1936 |
| 2,117,266 | Adams | May 17, | 1938 |
| 2,546,104 | MacGregor | Mar. 20, | 1951 |

FOREIGN PATENTS

| | | | |
|---|---|---|---|
| 3,141 | Great Britain | Feb. 7, | 1912 |
| 645,300 | Germany | May 25, | 1937 |